United States Patent [19]

Baker

[11] Patent Number: 4,972,111
[45] Date of Patent: Nov. 20, 1990

[54] INTERLOCKING MOTOR FIREPAN

[75] Inventor: Gerald N. Baker, St. Louis County, Mo.

[73] Assignee: Emerson Electric Co., St. Louis, Mo.

[21] Appl. No.: 370,811

[22] Filed: Jun. 23, 1989

[51] Int. Cl.$^5$ .................... H02K 5/10; A47B 47/03
[52] U.S. Cl. .......................... 310/88; 310/89; 310/91
[58] Field of Search ............ 310/43, 88, 89, 90, 310/91, 254, 258; 417/360, 423.15; 248/174, 221.3

[56] References Cited

U.S. PATENT DOCUMENTS

| 3,987,737 | 10/1976 | Smith | 248/174 |
| 4,342,929 | 8/1982 | Horne | 310/43 |
| 4,633,110 | 12/1986 | Genco et al. | 310/91 |
| 4,689,512 | 8/1987 | Kuivamaki | 310/89 |
| 4,720,648 | 1/1988 | De Vries et al. | 310/89 |

FOREIGN PATENT DOCUMENTS 59-50743 3/1984 Japan ........................... 310/89

Primary Examiner—Peter S. Wong
Assistant Examiner—D. L. Rebsch
Attorney, Agent, or Firm—Polster, Polster and Lucchesi

[57] ABSTRACT

Electric motor structure for protection against the emission of burning and molten materials from open areas of a motor frame supporting the motor structure, including a resilient fire resistant barrier sheet having edges thereof interlocking with the edges of the motor frame defining such open areas, to provide a tight protective fit.

13 Claims, 2 Drawing Sheets

INTERLOCKING MOTOR FIREPAN

BACKGROUND OF THE INVENTION

The present invention relates to electric motor structure and more particularly to an improved motor firepan or barrier shield to be associated with electric motor structure to protect from the uncontrolled emission of flammable objects from the electric motor structure which might otherwise occur in the event of a fire in such motor structure.

In accordance with Underwriters Laboratories Inc.'s requirements for motor-operated appliances, it is required that a barrier of fire resistant material be provided with the structural parts of a motor to protect against burning insulation or molten material falling, or otherwise being emitted to a selected, often combustible, surface that supports or needs shielded protection in an appliance with which an electric motor structure is associated.

In accordance with the present invention, it has been recognized that previous firepans used to comply with Underwriters Laboratories' requirements have been of comparatively costly, loose fitting sheet metal subject to ready vibration and rattling, creating problems in manufacture and assembly for initial and replacement usage. Recognizing these past problems, the present invention provides a unique and novel motor firepan structure which is straightforward and economical in manufacture, assembly and maintenance and which readily accommodates minor variations in motor structure tolerances without sacrifice of desirable tightness of fit, utilizing the resiliency and shape of the material of the firepan to protectively cover an open area and maintain a tight fit so as to avoid vibration and rattling.

Various other features of the present invention will become obvious to one skilled in the art upon reading the disclosure set forth herein.

SUMMARY OF THE INVENTION

More particularly, the present invention provides an improved electric motor structure comprising: a wound stator and rotor rotatably disposed with reference to the wound stator and having a rotor shaft extending therefrom; a pair of spaced end plates for rotatably journalling the rotor shaft relative the wound stator; longitudinally extending spaced support members connected at opposite ends thereof to and extending between the end plates to maintain the end plates in spaced relation to each other and to support the wound stator intermediate the opposed end plates, the end plates and support members forming an open support frame for the wound stator and rotor; at least one barrier sheet member of preselected geometric configuration sized to substantially cover at least one preselect open area determined by the edges of an adjacent pair of spaced support members and the spaced end plates; and, interlocking means cooperative between preselected adjacent edges of the barrier sheet and the open support frame for the wound stator and rotor, sufficient size and flexibility being provided between the preselected adjacent edges to allow the edges to be resiliently interlocked to fasten the barrier sheet in tight covering relation with the preselected open area. In addition, the present invention provides a novel, flexible, fire resistant material for the barrier sheet and a novel, spaced, tab arrangement joined together by soft non-tearing curves to provide a unique interlocking arrangement between preselected edges of a flexible barrier sheet.

It is to be understood that various changes can be made by one skilled in the art in one or more of the several parts of the apparatus disclosed herein without departing from the scope or spirit of the present invention. For example, various slots or interlocking tab arrangements can be utilized at different edges of the open area motor structure from that disclosed with the slots or tab members being located on the frame rather than on the barrier sheet as disclosed or on both frame and barrier sheet. Furthermore, various types of flexible, fire resistant materials can be used besides the novel phenol plastic material described herein.

BRIEF DESCRIPTION OF THE DRAWINGS

Referring to the drawings which disclose one advantageous embodiment of the present invention.

DETAILED DESCRIPTION OF THE DRAWINGS

Figure 1:
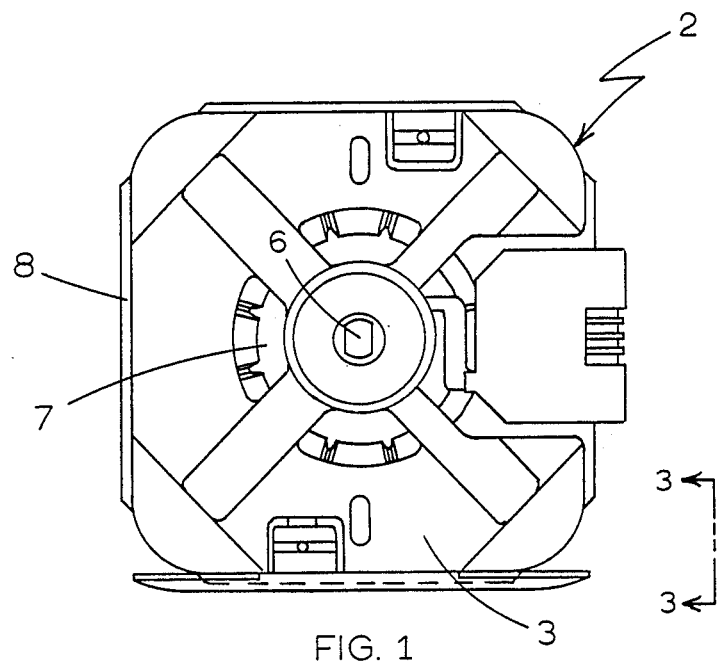
FIG. 1 is a front end view of an electric motor structure incorporating the novel motor firepan along the bottom side thereof.
Figure 2:
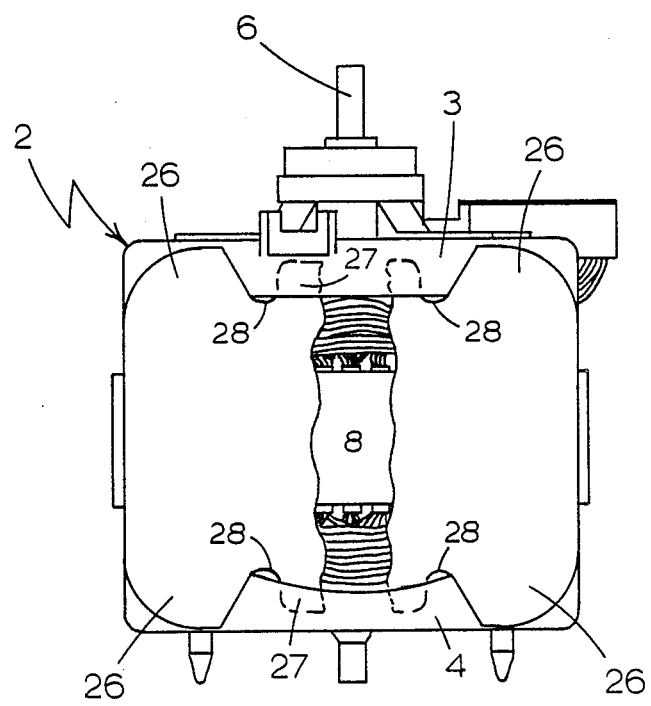
FIG. 2 is a partially broken away bottom view of the electric motor structure of FIG. 1, disclosing the novel manner in which spaced, opposed, overhanging, peripheral edges of the motor frame structure interlock with adjacent spaced, opposed, peripheral edges of the motor firepan structure.

As can be seen in FIG. 1, a front end view of a typical multi-speed electric motor structure 2 for a washing machine is disclosed. Motor structure 2 which can be made of a suitable rigid cast metallic material or metallic and plastic materials includes spaced end plates 3 and 4 (FIG. 2) for rotatably journalling and supporting horizontally disposed rotor shaft 6 therein. As known in the art and therefore not described in detail herein, rotor shaft 6 supports rotor 7 (only the front end of which can be seen in FIG. 1). Rotor 7 is rotatably disposed relative to coil wound stator 8, the bottom portion of which stator 8 can be seen in the broken portion of FIG. 2.

Figure 3:
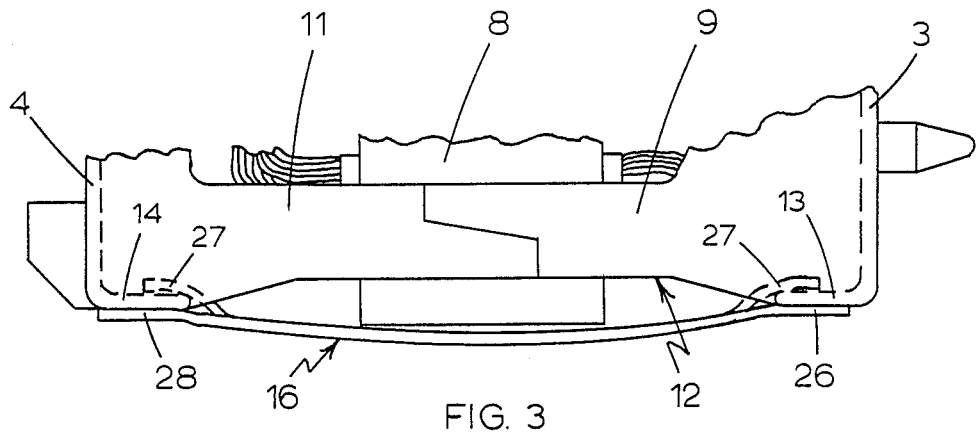
FIG. 3 is an enlarged right side view of the bottom portion of the electric motor structure taken in a view through line 3—3 of FIG. 1; and, FIG. 4 is an enlarged plan view of a novel motor firepan or barrier sheet.

Referring to FIG. 3 of the drawings, it can be seen that longitudinally extending spaced integral support portions 9 and 11 extend normally in opposed directions from the corresponding corners of spaced, opposed end plates 3 and 4 respectively, with corresponding extremities thereof being geometrically configured to overlap in dovetail relation to be connectively and fixedly joined, forming longitudinally extending support member 12. Although not shown in detail, it is to be understood that four such support members 12 are provided between each of the four corresponding corners of the opposed metallic or plastic end plates 3 and 4 to maintain the end plates 3 and 4 in spaced, opposed relation to each other, forming a four-sided open rectangular metallic or metallic and plastic support frame for coil wound stator 8 and rotor 7 rotatably disposed within stator 8 with rotor shaft 6 extending from rotor 7.

As can be seen in FIG. 3 of the drawings, each of spaced, opposed end plates 3 and 4 is provided with an overhanging peripheral edge or arras 13 and 14 respectively, the edges 13 and 14 being in spaced opposed relation. These overhanging peripheral edges 13 and 14 serve to receive in overlapping and interlocking relation therewith the opposed edges of a barrier sheet 16. Advantageously, barrier sheet 16 can be made of a fire resistant resilient phenolic board material of sufficient thickness and resiliency to allow a tight, interlocking fit described herein with the spaced, opposed overhanging peripheral edges 13 and 14 of end plates 3 and 4. The barrier sheet 16 provides a motor firepan or fire shield preventing molten material and burned insulation from falling or otherwise being emitted from the motor structure in the event of a fire. It is to be understood that the barrier sheet 16 can be appropriately sized to cover the open area between spaced opposed edges 13 and 14 and permit resilient overlapping therewith. It also is to be understood that other fire resistant, resilient, flexible materials can be used besides a phenolic plastic board material and that one or more of such barrier sheets can be utilized with an electric motor structure, depending upon the open areas to be covered and the motor orientation.

Figure 4:
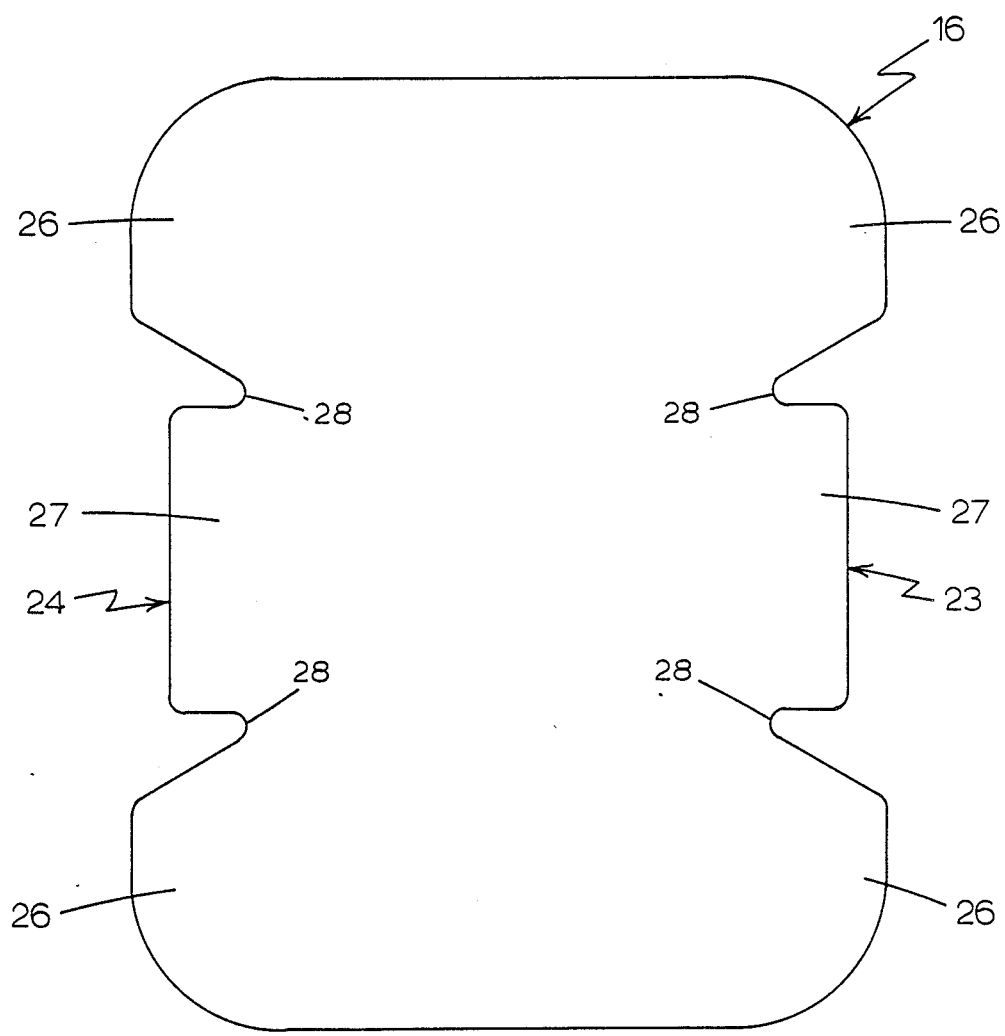

Referring to FIG. 4 of the drawings, details of the one advantageous form of interlocking barrier sheet 16 are disclosed. In this FIG. 4 it can be seen that the opposed edges 23 and 24 to be positioned adjacent to and in overlapping relation with the spaced, opposed peripheral overhanging edges 13 and 14 of end plates 3 and 4 respectively, each includes a set of three spaced, aligned integral tab members comprising end tabs 26 and intermediate tabs 27 at such opposed preselected edges with the connecting root portions 28 of adjacent tab members being preselectively rounded or softly curved to allow the opposed, intermediate tab members 27 of each set to engage in overlapping relation along the inner face of spaced, opposed peripheral edges 13 and 14 and the end tabs 26 of each set to engage in overlapping relation along the outer face of spaced, opposed peripheral edges 13 and 14. It is to be noted that middle or intermediate tab members 27 of each tab member set is shorter than end tab members 26 so as to minimize the bending of the barrier sheet 16 with the rounded connecting corners 28 therebetween, minimizing the possibility of tearing of the sheet during interlocking assembly and removal of barrier sheet 16. It also is to be understood, as abovementioned, that barrier sheet 16 can be sized and configured to cover any one or more of the open areas described to allow a resilient, tight interlocking fit with the spaced, opposed peripheral edges of the spaced end plates. Furthermore, it would be possible to use only one flexible, elongated integral barrier sheet with a different arrangement of interlocking tab members to cover two adjacent open areas with the elongated barrier sheet overlapping an intermediate support member 12 or to provide a single barrier sheet for each individual open area between adjacent support members 12.

The invention claimed is as follows:

1. An improved electric motor structure comprising:
 a wound stator and rotor rotatably disposed with reference to said wound stator and having a rotor shaft extending therefrom;
 a pair of spaced end plates for rotatably journalling said rotor shaft relative to said wound stator;
 longitudinally extending spaced support members connected at opposite ends thereof to and extending between said end plates to maintain said end plates in spaced relation relative to each other and to support said wound stator intermediate said opposite end plates, said end plates and connected support members forming an open support frame for said wound stator and rotor;
 at least one barrier sheet member of preselected geometric configuration sized to substantially cover at least one preselected open area determined by the edges of an adjacent pair of spaced support members and said spaced end plates; and
 interlocking means cooperative between preselected adjacent edges of said barrier sheet and said open support frame for said wound stator and rotor in the form of tab members integral with at least one of said adjacent edges with sufficient size and flexibility being provided between said preselected adjacent edges and tab members to allow said edges to be resiliently interlocked to fasten said barrier sheet in tight covering relation with said preselected open area.

2. The apparatus of claim 1, said end plates and said spaced support member forming said open support frame being integrally connected.

3. The apparatus of claim 1, said barrier sheet member covering the lowermost area determined by an adjacent spaced pair of spaced support members.

4. The apparatus of claim 1, said formed open support frame being rectangular to include four open areas.

5. The apparatus of claim 1, said interlocking means comprising tab members integral with said barrier sheet.

6. The apparatus of claim 1, said interlocking means comprising tab members integral with said open support frame.

7. The apparatus of claim 1, said interlocking means comprising tab members integral with both said open support frame and said barrier sheet.

8. The apparatus of claim 1, said open support frame being rigid and said barrier sheet being of a fire resistant, resilient material with sufficient resiliency to allow said interlocking means to maintain a tight fit between preselected edges of said barrier sheet and support frame.

9. The apparatus of claim 1, said support frame being of rigid galvanized metal material and said barrier sheet being of a flexible plastic material.

10. The apparatus of claim 1, said end plates being of plastic material.

11. The apparatus of claim 1, said interlocking means including at least three interlocking spaced tab members integral with and extending from each of opposed preselected edges of said barrier sheet, said barrier sheet being of a fire resistant, resilient material with sufficient resiliency to allow said tab members to maintain a tight interlocking fit between said tab members at preselected edges of said flexible barrier sheet and said support frame.

12. An improved electric motor structure comprising:
 a wound stator and rotor rotatably disposed with reference to said wound stator and having a rotor shaft extending therefrom;
 a pair of spaced substantially rectangular metallic end plates for rotatably journalling said rotor shaft relative to said wound stator to support said rotor shaft in a horizontal plane;
 longitudinally extending spaced integral support portions extending normally in opposed directions from the four corresponding corners of each of said metallic end plates with corresponding extremities thereof being connectively joined to provide longitudinally extending support members at each corner, maintaining said end plates in spaced relation relative to each other to form an open rectangular metallic support frame for said wound stator and rotor, each of said end plates being provided with opposed overhanging peripheral edges;

a barrier sheet of fire resistant, resilient, phenolic board material having sets of three spaced, aligned, integral tab members at opposed preselect edges therefor with the roof portions of adjacent tab members being preselectively rounded, said sheet and tab members being sized and configured to substantially cover the lowermost open area of said rectangular frame as determined by an adjacent pair of spaced corner support members with said spaced, aligned, integral tab members resiliently interlocking in close nesting engagement with said opposed, adjacent overhanging peripheral edges of said end plate in tight relation to provide a fire shield for said electric motor structure.

13. The electric motor structure of claim 12, the middle tab members of each tab member set being shorter than the end tab members to engage internally of an overhanging peripheral edge with the outer tab members engaging said overhanging edge externally to minimize bending of said barrier sheet.

* * * * *